June 5, 1951   M. S. NEWMAN   2,555,598
6-ACYLOXY-4-METHYLHEXYNE-2-DIOL-1,4
AND METHOD FOR PRODUCING THE SAME
Filed May 10, 1947   4 Sheets-Sheet 3

INVENTOR.
MELVIN SPENCER NEWMAN
BY
ATTORNEY

June 5, 1951  
M. S. NEWMAN  
2,555,598  
6-ACYLOXY-4-METHYLHEXYNE-2-DIOL-1,4  
AND METHOD FOR PRODUCING THE SAME  
Filed May 10, 1947  
4 Sheets—Sheet 4

INVENTOR.  
MELVIN SPENCER NEWMAN  
BY  
ATTORNEY

Patented June 5, 1951

2,555,598

UNITED STATES PATENT OFFICE 2,555,598

6-ACYLOXY-4-METHYLHEXYNE-2-DIOL-1,4 AND METHOD FOR PRODUCING THE SAME

Melvin S. Newman, Columbus, Ohio, assignor to Ohio State University Research Foundation, Columbus, Ohio, a corporation of Ohio Application May 10, 1947, Serial No. 747,175

11 Claims. (Cl. 260—476)

This invention relates to new compounds or compositions of matter useful as intermediates in the synthetic production of vitamin A or its esters and to processes for synthesizing such new compounds. It is illustrated by processes of forming acyloxy methylhexyne diols having the formula

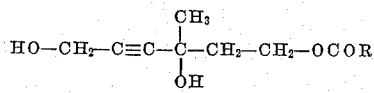

where R is a member of the class consisting of alkyl, aryl, aralkyl and cycloalkyl. Prior hereto there has been no recognized method of preparing 6-acyloxy-4-methylhexyne-2-diols-1,4. Nor have these materials been previously synthesized nor isolated.

One of the objects of my invention is the production of new and useful compositions of matter useful as intermediate chemical compounds in the synthesizing of vitamin A or its esters, of similar compounds and of other chemicals.

Another object of my invention is the provision of new methods of synthesizing such various intermediates and other chemicals.

A further object of my invention is the synthesizing of acyloxy butanones and new methylhexyne-diols and the provision of methods for synthesizing such compounds.

Features of the processes described herein in illustration of my invention include the synthesis of such products by reaction of a hydroxy-butanone and pyridine with acyl chloride and the subsequent reaction of the product thereof with a propargyl metal derivative formed by mixing with propargyl alcohol any suitable organo metallic reagent such as, for example, phenyllithium, phenylmagnesium bromide, and butylmagnesium chloride or any other reagent known in the prior art.

Other features of my invention include the synthesis of 6-benzoxy-4-methylhexyne-2-diol-1,4; 6 - trimethylacetoxy - 4 - methylhexyne - 2 - diol-1,4; 1-benzoxy - 3 - butanone; and 1 - trimethylacetoxy-3-butanone.

Further features include the preparation of new compounds by which the methylhexynediols thus formed may be identified.

Further objects and features of the present invention will be apparent from the following description, reference being had to the accompanying drawings wherein preferred forms of embodiments of the invention are clearly shown.

Figure 1:
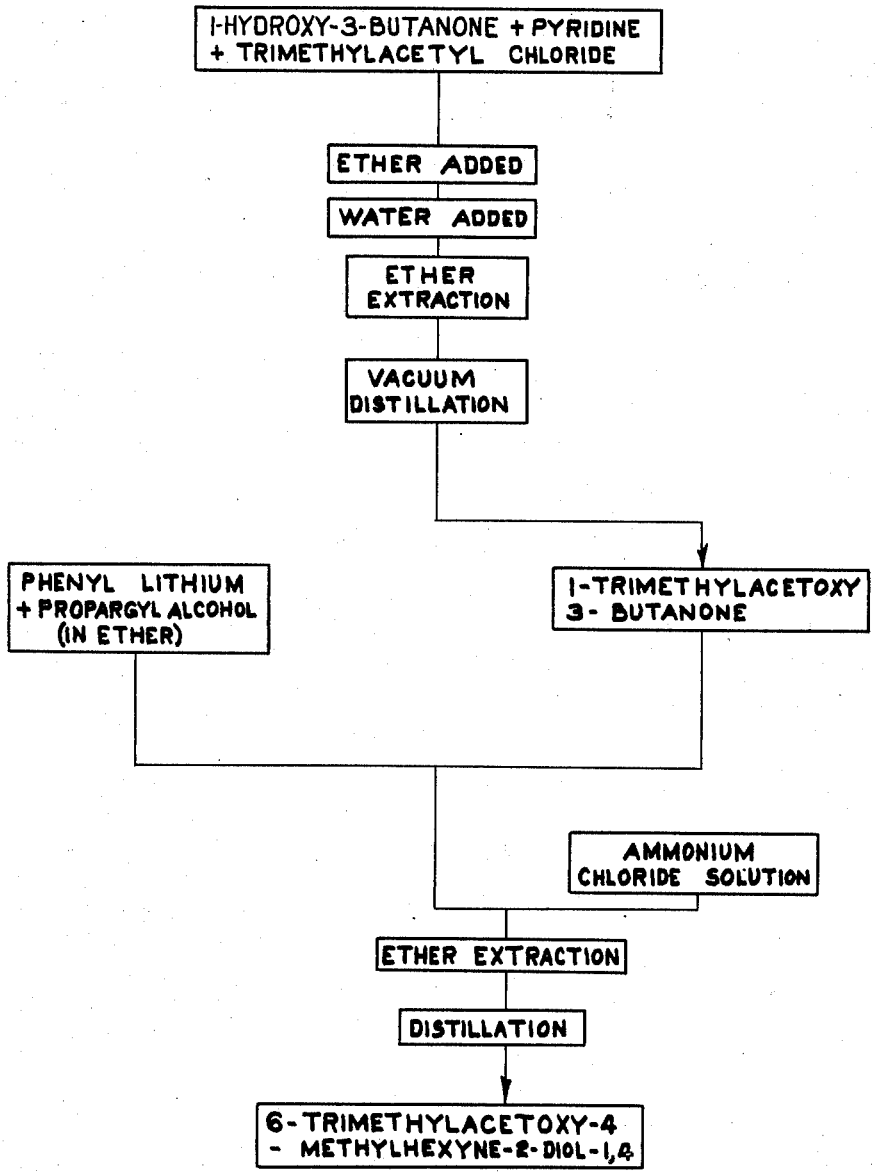
Fig. 1 illustrates a method of synthesizing one of the substances selected in illustration of my invention, the substances referred to and methods shown constituting some of the preferred embodiments of the invention.
Figure 2:
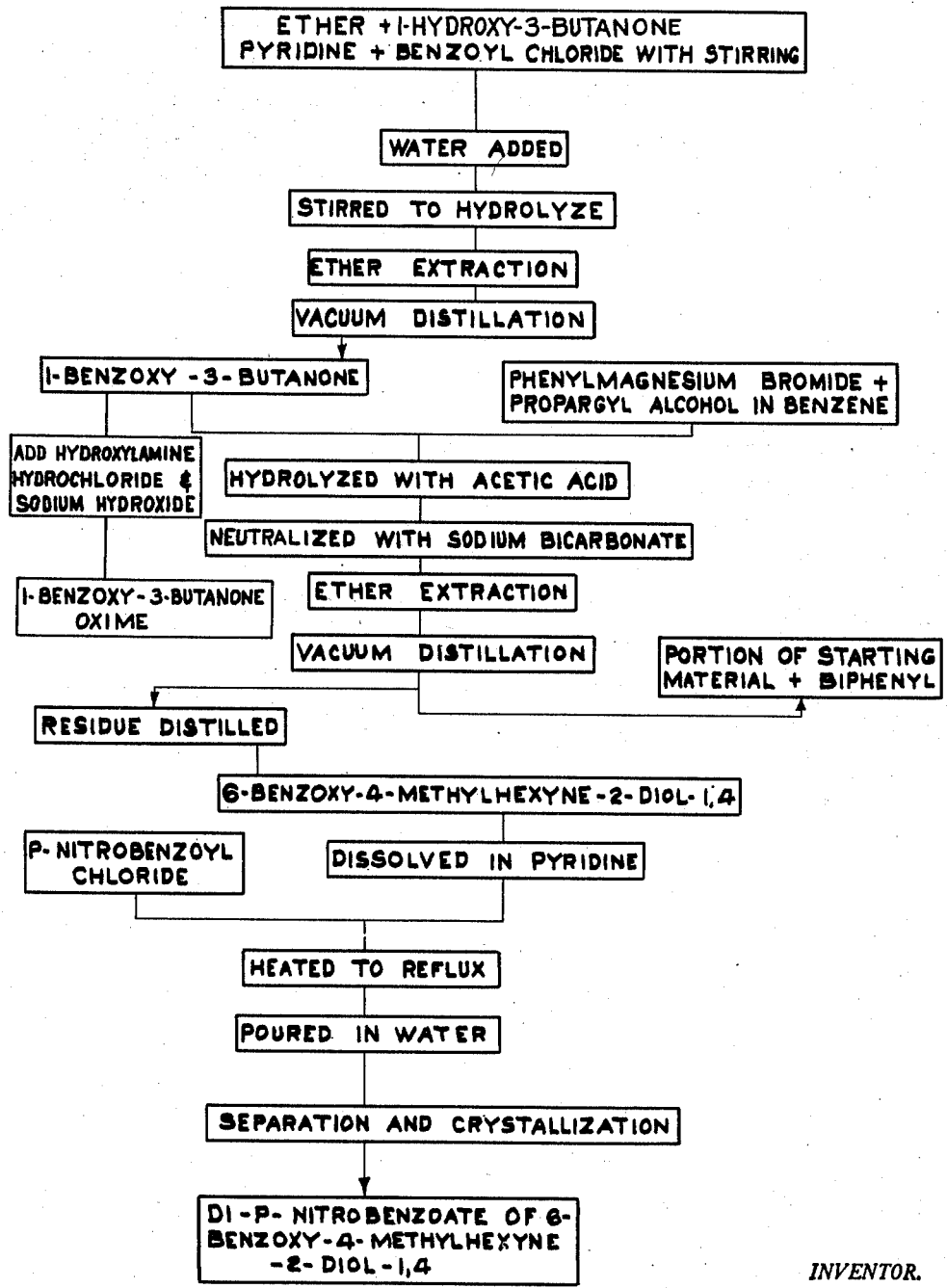
Fig. 2 illustrates a method of synthesizing another of the substances selected in illustration of my invention, the substances referred to and the methods shown constituting others of the preferred embodiments of the invention.
Figure 5:
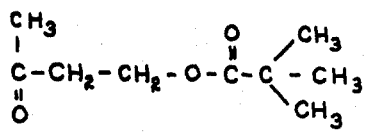
Fig. 5 shows the structural formula of a trimethylacetoxy butanone which may be synthesized by my process.
Figure 3:
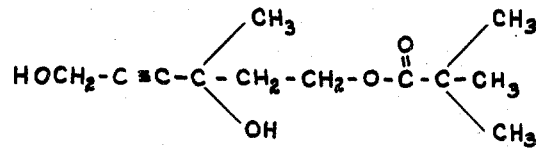
Fig. 3 shows the structural formula of a trimethylacetoxy methylhexyne-diol which may be synthesized by my process.
Figure 4:
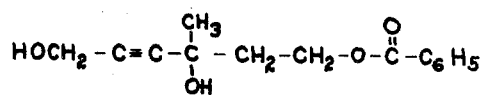
Fig. 4 shows the structural formula of a benzoxy methylhexyne-diol which may be synthesized by my process.
Figure 6:
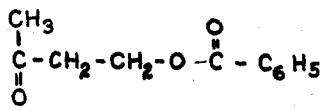
Fig. 6 shows the structural formula of a benzoxy-butanone which may be synthesized by my process.

In general, one of the processes of my invention comprises the reaction of 1-hydroxy-3-butanone with an acyl halide in the presence of an acid-binding agent; isolation of the acyloxy-3-butanone reaction thereof with a metal derivative of propargyl alcohol; hydrolysis of the organo metallic complex to give the 6-acyloxy-4-methylhexyne-2-diol-1,4 which may then be isolated from the reaction mixture and further purified. Any acyl halide can be used within the scope of the invention. For purposes of illustration, trimethylacetylchloride and benzoyl chloride have been used. For an acid-binding agent, any tertiary amine or an aqueous alkali according to the Schotten-Baumann method may be used. By a metal derivative of a propargyl alcohol, I mean a compound in which a metal is attached directly to the carbon having a triple bond. Among the metals which may be used are the alkali metals such as lithium, potassium and sodium; alkaline earth metals such as calcium or barium; and other metals such as magnesium.

For the preparation of the reagent it is better to react propargyl alcohol with a Grignard reagent or a metal alkyl reagent rather than reacting the propargyl alcohol directly with the metal. Any Grignard reagent is suitable for this purpose and among the metal alkyls which may be used are phenyllithium, butyllithium, triphenylmethylsodium and other similar reagents.

The reaction between the metal derivative of propargyl alcohol and the 1-acyloxy-3-butanone is preferably carried out in an inert solvent such as diethyl ether, tetrahydrofurane and others. Certain hydrocarbons such as pentane, hexane, benzene, and toluene may be used but are not as good as the preferred solvents mentioned.

The hydrolysis is accomplished by the addition of water. Other materials such as ammonium chloride or acids such as acetic acid may be added to facilitate the removal of metal salts formed during the hydrolysis.

The specific examples illustrated in the drawings disclose the synthesis of 6-trimethylacetoxy-4-methylhexyne-2-diol-1,4 and the 6-benzoxy-4-methylhexyne-2-diol-1,4. For instance, there is illustrated the reaction of a solution of 1-hydroxy-3-butanone and pyridine with trimethylacetyl chloride; the dissolving of the pyridine hydrochloride with water; extraction of the reaction product with ether; and vacuum distillation to yield a 1-trimethylacetoxy-3-butanone. Thereafter in synthesizing the trimethylacetoxy methylhexyne-diol from the butanone, the illustrated process consists in general of reacting phenyllithium and propargyl alcohol in ether; the addition thereto of the 1-trimethylacetoxy-3-butanone and the reaction thereof; the hydrolysis of the reaction product by an ammonium chloride solution; extraction of the product with ether; and the distillation of the 6-trimethylacetoxy-4-methylhexyne-2-diol-1,4.

The reactions involved in this specific example are shown by the following equations:

(1)

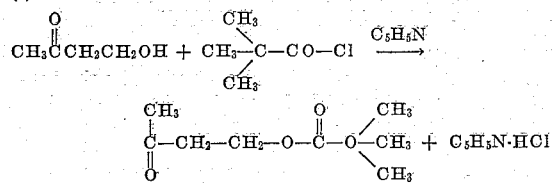

(2)

$$2C_6H_5Li + CH \equiv C-CH_2OH \longrightarrow LiC \equiv C-CH_2-O-Li + 2C_6H_6$$

(3)

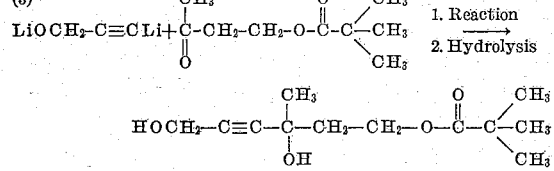

The other specific process illustrated consists of the reaction of benzoyl chloride with 1-hydroxy-3-butanone in solution in ether and pyridine, the pyridine acting first as a catalyst and later combining to form pyridine hydrochloride with the hydrogen chloride formed by the condensation of the hydroxybutanone with the benzoxy chloride; addition of water to dissolve the pyridine hydrochloride; extraction of the condensation product by ether; and vacuum distillation to give 1-benzoxy-3-butanone; the reaction of phenylmagnesium bromide with propargyl alcohol to form a propargyl magnesium bromide; the reaction of this propargyl magnesium complex with the benzoxy-butanone previously formed; hydrolyzation of the product; neutralization of excess acid; and distillation of the products to isolate a 6-benzoxy-4-methylhexyne-2-diol-1,4. The reaction equations in this specific example are as follows:

(1)

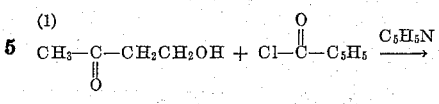

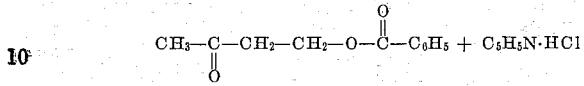

(2)

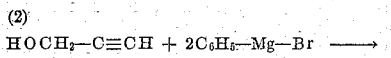

(3)

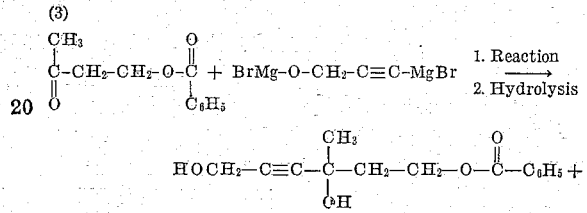

The final products obtained by these methods are intermediate products useful in the production of vitamin A and vitamin A esters and in the synthetic production of other chemical compounds.

Figure 8:
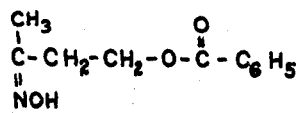
Fig. 8 shows the structural formula of a derivative of the compound shown in Fig. 6, which I used in identifying the benzoxy butanone.

To further characterize the benzoxybutanone of the above process, I reacted the 1-benzoxy-3-butanone with hydroxylamine hydrochloride and sodium hydroxide to obtain 1-benzoxy-3-butanone oxime. (Fig. 8.)

Figure 7:
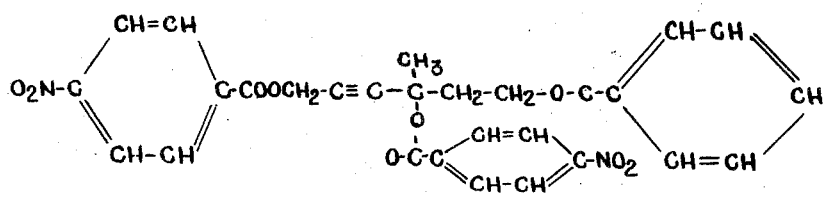
Fig. 7 shows the structural formula of a derivative of the compound shown in Fig. 4, which I used in identifying the benzoxy methylhexyne-diol.

To further characterize the 6-benzoxy-4-methylhexyne-2-diol-1,4, I reacted it with p-nitrobenzoyl chloride to form a di-p-nitrobenzoate of 6-benzoxy-4-methylhexyne-2-diol-1,4. (Fig. 7.)

The following Examples I to VI, inclusive, are presented in illustration of my invention but the inventions are not to be considered as limited to the specific examples.

EXAMPLE I

*Preparation of 1-trimethylacetoxy-3-butanone*

To an ice cold solution of 49 g. (.56 mole) of 1-hydroxy-3-butanone and 48 g. (.6 mole) of pyridine, there was added dropwise with stirring 72 g. (.6 mole) of trimethylacetyl chloride. Dry ether was added to facilitate stirring, which was continued for one hour at ice-bath temperature and five hours at room temperature.

After standing overnight, water was added to dissolve the pyridine hydrochloride and the product was isolated by ether extraction.

Vacuum distillation yielded 69.0 g. of ester; B. P. 105° at 14 mm.; $n_D^{20} = 1.4208$; yield 85%.

[Calcd. as $C_9H_{16}O_3$.]

|   | Theoretical | Found | |
|---|---|---|---|
| C | 62.8 | 63.0 | 63.0 |
| H | 9.4 | 9.8 | 9.8 |

Semicarbazone, M. P. 133–134°.

The product has the following structural formula:

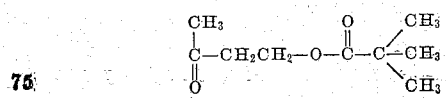

EXAMPLE II

*Preparation of 6-trimethylacetoxy-4-methylhexyne-2-diol-1,4*

To a cold solution of 0.5 mole of phenyllithium in 460 cc. of ether there was added 14 g. (.25 mole) of propargyl alcohol in ether. The addition required 45 minutes and stirring was continued for an additional 15 minutes.

To the stirred complex there was added 47.3 g. (.275 mole) of 1-trimethylacetoxy-3-butanone in ether. The addition was rapid and the reaction was cooled throughout the process.

After stirring one-half an hour saturated ammonium chloride solution was added and the product was isolated by ether extraction, followed by distillation on a Hickman still under greatly reduced pressure. The distillate solidified and was recrystallized from petroleum ether B. P. 90–100° C.) and ether. Yield 20% of product; M. P. 54.4–55.5° C.

[Calcd. as $C_{12}H_{20}O_4$.]

|   | Theoretical | Found | |
|---|---|---|---|
| C | 63.1 | 63.2 | 63.2 |
| H | 8.8 | 8.5 | 8.7 |

The product has the following structural formula:

$$HOCH_2-C\equiv C-\underset{\underset{OH}{|}}{\overset{\overset{CH_3}{|}}{C}}-CH_2CH_2-O-\overset{\overset{O}{\|}}{C}-\underset{\underset{CH_3}{|}}{\overset{\overset{CH_3}{|}}{C}}-CH_3$$

EXAMPLE III

*Preparation of 1-benzoxy-3-butanone*

To 500 cc. of dry ether there was added 71.2 g. (.81 mole) of 1-hydroxy-3-butanone and 79 g. (1.0 mole) of pyridine. The reaction vessel was surrounded by an ice bath and there was added with stirring over the period of one hour 120 g. (.85 mole) of benzoyl chloride. Stirring was continued for three and one-half hours and then the reaction was allowed to stand overnight.

Water was added to dissolve the pyridine hydrochloride and the reaction was stirred two hours to hydrolyze any excess benzoyl chloride.

The product was isolated by ether extraction and vacuum distillation. Yield 145.0 g. (95%) of ester; B. P. 106.5–108.5° at 0.5 mm. Its structural formula is:

$$\underset{\underset{O}{\|}}{\overset{\overset{CH_3}{|}}{C}}-CH_2CH_2-O-\overset{\overset{O}{\|}}{C}-C_6H_5$$

EXAMPLE IV

*Preparation of 6-benzoxy-4-methylhexyne-2-diol-1,4*

To 470 ml. (1 mole) of 2.13 mole phenylmagnesium bromide, diluted with an equal volume of benzene, there was added 28 g. (0.5 mole) of propargyl alcohol in 300 ml. of benzene. To the resulting complex there was added 96 g. (.5 mole) of 1-benzoxy-3-butanone in 300 ml. of benzene. The reaction was stirred one half an hour and hydrolyzed with dilute acetic acid.

After neutralization of excess acetic acid with sodium bicarbonate, the product was isolated by ether extraction.

Vacuum distillation yielded 34.8 g. of material, B. P. 83–117° at 0.5 mm. which consisted of starting material and some biphenyl. The residue weighed 74.8 g. The residue was distilled on a Hickman still under greatly reduced pressure yielding the following results:

| Fraction | Bath | Pressure, mm-Hg | Weight | Per Cent Yield |
|---|---|---|---|---|
| 1 | 125 | .04 | 11.8 | |
| 2 | 125–135 | .04 | 5.1 | |
| 3 | 135–156 | .04 | 4.0 | |
| 4 | 156–170 | .04 | 32.3 | 26 |
| 5 | Residue | .04 | 16.0 | |

The structural formula of the product of fraction 4 is:

$$HOCH_2-C\equiv C-\underset{\underset{OH}{|}}{\overset{\overset{CH_3}{|}}{C}}-CH_2-CH_2-O-\overset{\overset{O}{\|}}{C}-C_6H_5$$

EXAMPLE V

*Preparation of 1-benzoxy-3-butanone oxime*

To 5 g. of hydroxylamine hydrochloride in 30 cc. of water there was added 20 cc. of 10% sodium hydroxide and 2 g. of 1-benzoxy-3-butanone. Sufficient alcohol was added to effect solution and the whole was heated for ten minutes on the steam bath.

The reaction was cooled in ice and the oxime which crystallized was collected by filtration.

The crude material was recrystallized from alcohol-water to a constant melting point of 93.5–94.5°.

[Calcd. as $C_{11}H_{13}NO_3$.]

|   | Theoretical | Found | |
|---|---|---|---|
| C | 63.8 | 63.8 | 63.7 |
| H | 6.3 | 6.3 | 6.3 |
| N | 6.7 | 6.7 | 6.6 |

The structural formula of the product is:

$$\underset{\underset{NOH}{\|}}{\overset{\overset{CH_3}{|}}{C}}-CH_2CH_2-O-\overset{\overset{O}{\|}}{C}-C_6H_5$$

EXAMPLE VI

*Preparation of di-p-nitrobenzoate of 6-benzoxy-4-methylhexyne-2-diol-1,4*

To 0.7 g. of 6-benzoxy-4-methylhexyne-2-diol-1,4 in 5–10 cc. of pyridine there was added 1.1 g. of p-nitrobenzoyl chloride. The whole was heated to reflux and then poured in water. The amorphous solid was separated and crystallized from alcohol. After several recrystallizations, the product melted at 109.0–109.6° C.

[Calcd. as $C_{28}H_{29}O_{10}N_2$.]

|   | Theoretical | Found | |
|---|---|---|---|
| C | 61.5 | 61.3 | 61.4 |
| H | 4.1 | 4.3 | 4.2 |
| N | 5.1 | 4.9 | 4.9 |

The structural formula of the product is

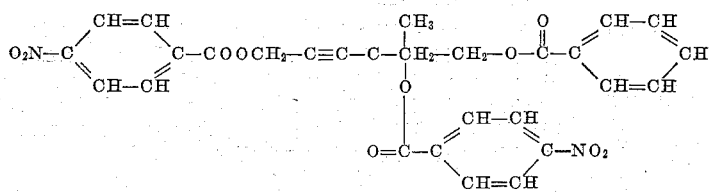

Although the compositions of matter and processes shown and described in illustration of the present inventions in the foregoing specification constitute preferred forms, and I wish it to be understood that I do not desire to be limited to the exact details of the composition of matter and processes shown and described, for obvious modifications will occur to a person skilled in the art, all coming within the scope of the claims which follow.

I claim:

1. As a new article of manufacture a compound of the formula

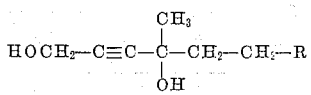

wherein R is a member of the group consisting of the acetoxy and benzoxy radicals.

2. A new article of manufacture consisting of 6-benzoxy-4-methylhexyne-2-diol-1,4.

3. As a new article of manufacture, a methylhexyne-diol consisting of a compound having the general structural formula of

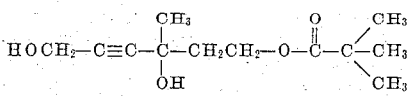

4. A method of synthesizing a methylhexynediol which comprises the steps of adding a halide, having a formula of RX in which R is a member selected from the group consisting of benzoyl and acetyl radicals and X is a halogen atom, to a solution of 1-hydroxy-3-butanone in the presence of an acid-binding agent; isolating and purifying the resulting butanone; mixing a propargyl metallic complex with the butanone; hydrolyzing the reaction product; and isolating the resulting 6-acyl-4-methylhexyne-2-diol-1,4, where the acyloxy member is selected from the group consisting of benzoxy and acetoxy radicals.

5. A method of synthesizing a vitamin A intermediate which comprises the steps of adding an acetyl halide to a solution of 1-hydroxy-3-butanone in the presence of an acid-binding agent; isolating and purifying the resulting 1-acetoxy-3-butanone; mixing a propargyl metal complex with the acetoxy butanone; and hydrolizing the reaction product.

6. A method of synthesizing a methylhexynediol which comprises the steps of adding trimethylacetyl chloride to a solution of 1-hydroxy-3-butanone and pyridine; adding water to dissolve the pyridine hydrochloride formed; extracting the product; distilling under vacuum to produce a 1-trimethylacetoxy-3-butanone; mixing phenyllithium with propargyl alcohol in ether to form a propargyl metallic complex; adding the trimethylacetoxy butanone to the complex; adding saturated ammonium chloride solution; extracting the product with ether; and distilling to isolate a trimethylacetoxy-4-methylhexyne-2-diol-1,4.

7. A process of forming 6-benzoxy-4-methylhexyne-2-diol-1,4 which comprises the steps of reacting a propargyl metal derivative with 1-benzoxy-3-butanone; hydrolyzing the resulting complex; and isolating the desired product.

8. A process of forming 6-benzoxy-4-methylhexyne-2-diol-1,4 which comprises the steps of mixing phenylmagnesium bromide with propargyl alcohol; adding 1-benzoxy-3-butanone; hydrolyzing; extracting the product; and distilling the extracted product.

9. A method of forming a 6-benzoxy-4-methylhexyne-2-diol-1,4 which comprises the steps of reacting 1-hydroxy-3-butanone with benzoyl chloride in the presence of an acid-binding agent; and reacting the ester so formed with a propargyl metal derivative.

10. A method of synthesizing a 6-acetoxy-4-methylhexyne-2-diol-1,4 which comprises the steps of reacting a propargyl metal derivative with a 1-acetoxy-3-butanone; hydrolyzing; and isolating and purifying the resulting product.

11. A process of forming a 6-trimethylacetoxy-4-methylhexyne-2-diol-1,4 which comprises the steps of mixing phenyl lithium with propargyl alcohol to form a propargyl metal derivative; adding 1-trimethylacetoxy-3-butanone to the propargyl metal derivative; adding ammonium chloride solution; extracting the product; and distilling the extracted product.

MELVIN S. NEWMAN.

REFERENCES CITED

The following references are of record in the file of this patent:

UNITED STATES PATENTS

| Number | Name | Date |
|---|---|---|
| 2,010,828 | Rothrock | Aug. 13, 1935 |
| 2,253,342 | Mikeska et al. | Aug. 19, 1941 |
| 2,369,157 | Milas | Feb. 13, 1945 |
| 2,369,159 | Milas | Feb. 13, 1945 |
| 2,382,085 | Milas | Aug. 14, 1945 |
| 2,382,086 | Milas | Aug. 14, 1945 |
| 2,412,465 | Milas | Dec. 10, 1946 |

OTHER REFERENCES

Buchman, Jour. Am. Chem. Soc., 67, 400–403 (1945).